United States Patent [19]
Larson et al.

[11] Patent Number: 6,153,690
[45] Date of Patent: Nov. 28, 2000

[54] METHOD OF PRODUCING ISOCYANATE-MODIFIED LATEX POLYMER

[75] Inventors: Gary Robert Larson, Hatfield; Kurt Arthur Wood, Abington, both of Pa.

[73] Assignee: Rohm and Haas Company, Philadelphia, Pa.

[21] Appl. No.: 08/657,477

[22] Filed: May 29, 1996

[51] Int. Cl.$^7$ .............................. C08L 75/04; C08L 75/06; C09D 175/04; C09D 175/06
[52] U.S. Cl. .......................... 524/839; 524/502; 524/507; 524/555; 524/556; 524/560; 524/591; 524/804; 524/812; 524/816; 524/827; 524/831; 524/832; 524/840
[58] Field of Search ................................. 524/502, 555, 524/556, 560, 591, 804, 812, 816, 827, 831, 832, 839, 840, 507

[56] References Cited

U.S. PATENT DOCUMENTS

| | | | |
|---|---|---|---|
| Re. 34,093 | 10/1992 | Powell et al. | 524/228 |
| 3,684,758 | 8/1972 | Honig et al. | 524/507 |
| 3,705,164 | 12/1972 | Honig et al. | 524/591 |
| 4,186,118 | 1/1980 | Reischl et al. | 528/52 |
| 4,198,330 | 4/1980 | Kaizerman et al. | 525/185 |
| 4,318,833 | 3/1982 | Guagliardo | 524/457 |
| 4,325,856 | 4/1982 | Ishikawa et al. | 523/201 |
| 4,396,738 | 8/1983 | Powell et al. | 524/228 |
| 4,444,955 | 4/1984 | Mels et al. | 525/124 |
| 4,598,120 | 7/1986 | Thoma et al. | 524/591 |
| 4,609,690 | 9/1986 | Gruber et al. | 523/334 |
| 4,636,546 | 1/1987 | Chao | 524/507 |
| 4,644,030 | 2/1987 | Loewrigkeit et al. | 524/457 |
| 4,654,397 | 3/1987 | Mueller-Mall et al. | 524/460 |
| 4,663,377 | 5/1987 | Hombach et al. | 524/196 |
| 4,711,918 | 12/1987 | Kubitza et al. | 524/196 |
| 4,730,021 | 3/1988 | Zom et al. | 524/457 |
| 4,766,177 | 8/1988 | Miller et al. | 525/131 |
| 4,814,373 | 3/1989 | Frankel et al. | 524/460 |
| 4,888,383 | 12/1989 | Huybrechts | 524/832 |
| 4,916,171 | 4/1990 | Brown et al. | 523/161 |
| 4,948,829 | 8/1990 | Mitsuji et al. | 524/457 |
| 4,968,536 | 11/1990 | Goldner et al. | 427/388.4 |
| 5,023,294 | 6/1991 | Cozzi et al. | 524/547 |
| 5,037,913 | 8/1991 | Leussler et al. | 526/201 |
| 5,051,464 | 9/1991 | Johnson et al. | 524/555 |
| 5,075,370 | 12/1991 | Kubitza et al. | 524/591 |
| 5,104,928 | 4/1992 | Craun et al. | 524/773 |
| 5,115,064 | 5/1992 | Jung et al. | 526/301 |
| 5,137,961 | 8/1992 | Goos et al. | 524/457 |
| 5,157,074 | 10/1992 | Metzger et al. | 524/589 |
| 5,169,719 | 12/1992 | Balatan | 428/423.1 |
| 5,173,526 | 12/1992 | Vijayendran et al. | 524/457 |
| 5,185,200 | 2/1993 | Tirpak et al. | 428/288 |
| 5,200,489 | 4/1993 | Jacobs et al. | 528/49 |
| 5,202,377 | 4/1993 | Thorne et al. | 524/591 |
| 5,212,230 | 5/1993 | Tirpak et al. | 524/589 |
| 5,227,422 | 7/1993 | Mitsuji et al. | 524/457 |
| 5,281,655 | 1/1994 | Mitsuj et al. | 524/507 |
| 5,552,477 | 9/1996 | Dhein et al. | 524/840 |
| 5,594,065 | 1/1997 | Tien et al. | 524/507 |
| 5,747,166 | 5/1998 | Schwarte et al. | 428/423.1 |
| 5,886,082 | 3/1999 | Numa et al. | 524/501 |

FOREIGN PATENT DOCUMENTS

| | | |
|---|---|---|
| 486881 | 11/1991 | European Pat. Off. . |
| 511457 | 1/1992 | European Pat. Off. . |
| 2643642A1 | 9/1976 | Germany . |
| 4007637 | 3/1990 | Germany . |
| 4129951 | 9/1991 | Germany . |
| 3086713 | 4/1991 | Japan . |

OTHER PUBLICATIONS

Bock, M. et al., Bayer AG, Leverkusen, Germany, "Aqueous Polyurethane Coatings Systems For Plastics", Modern Paint And Coatings, Feb. 1996.

*Primary Examiner*—Rabon Sergent
*Attorney, Agent, or Firm*—Wendy A. Choi

[57] ABSTRACT

The present invention is directed to a method of producing a waterborne isocyanate-modified acrylic polymer. The method provides for reacting a compound having at least two-isocyanate functionalities with an isocyanate-reactive polymer to produce the isocyanate-modified acrylic polymer of the present invention having extended shelf stability and solvent resistance.

11 Claims, No Drawings

METHOD OF PRODUCING ISOCYANATE-MODIFIED LATEX POLYMER

The present invention is directed to a method of producing isocyanate-modified acrylic polymer and more particularly to a method of producing shelf stable waterborne dispersion of an acrylic-urethane graft copolymer.

While numerous patents for waterborne acrylic-urethane graft copolymers exist, they describe processes which begin with some variant of a standard polyurethane dispersion (PUD) synthesis, followed by an emulsion polymerization. In such processes, a prepolymer having isocyanate-functionality is made in the absence of water, typically in a volatile and flammable solvent since the isocyanate-functionality, which is highly reactive reacts with water. The prepolymer is then dispersed into water, after which an acrylic polymer is grafted on the prepolymer to produce the waterborne acrylic-urethane graft copolymers. To avoid water contamination during this critical step, it is common to use two reaction vessels, one for the prepolymer synthesis, and a second for the emulsion synthesis. However, it is difficult to control the intended stoichiometric balance and the molecular weight of the resulting prepolymer when prepared by such a process. Due to the molecular weight build-up, the resulting prepolymer tends to gel easily and has high viscosity. As a result, it is difficult to disperse such a prepolymer in water. Since the prepolymer must be dispersed into water in the emulsion kettle, high powered stirring equipment is usually required for reaction vessels. (*Progress in Organic Coatings*, 9 (1981), 281–340).

The problems described earlier are common to both the synthesis of PUDs and acrylic-urethane graft copolymers. They are well known in the art and attempts to improve the situation generally focus on ways to bring down the prepolymer viscosity to make the dispersion step easier to accomplish. The U.S. Pat. No. 4,888,383 (hereinafter '383 patent) to Huybrechts discloses a method for preparing a stable dispersion of polyurethane modified polyacrylic. The method provides for adding a prepolymer chain of polyisocyanate or isocyanate-terminated polyurethane to a reaction mixture consisting of an aqueous dispersion or emulsion of amine-functional and hydroxyl-functional polyacrylic for causing a chain extension of the ingredients. The need for two reaction vessels in these syntheses is generally taken for granted, because of the need to control the isocyanate reaction during the prepolymer synthesis by excluding water. Thus, there exists a need for a process for producing a waterborne isocyanate-modified acrylic polymer which is not sensitive to the rise in viscosity from chain building reactions, and in which it is possible to exercise a considerable degree of control over the rate of isocyanate reactivity even in the presence of water.

The present invention is directed to a novel method of producing a waterborne isocyanate-modified acrylic polymer comprising:

reacting a compound terminated with at least two isocyanate-functional groups with an isocyanate-reactive polymer in an aqueous medium to produce said waterborne isocyanate-modified acrylic polymer.

As used herein:

"GPC weight average molecular weight" means the weight average molecular weight determined by gel permeation chromatography (GPC) which is described on page 4, Chapter I of The Characterization of Polymers published by Rohm and Haas Company, Philadelphia, Pa. in 1976, utilizing polymethyl methacrylate as the standard. The GPC weight average molecular weight can be estimated by calculating a theory weight average molecular weight. In systems containing chain transfer agents, the theory weight average molecular weight is simply the total weight of polymerizable monomer in grams divided by the total molar amount of chain transfer agent used during the polymerization. Estimating the molecular weight of an emulsion polymer system that does not contain a chain transfer agent is more complex. A cruder estimate can be obtained by taking the total weight of polymerizable monomer in grams and dividing that quantity by the product of the molar amount of an initiator multiplied by an efficiency factor (in our persulfate initiated systems, we have used a factor of approximately 0.5). Further information on theoretical molecular weight calculations can be found in *Principles of Polymerization* 2nd edition, by George Odian published by John Wiley and Sons, N.Y., N.Y. in 1981 and in *Emulsion Polymerization* edited by Irja Pirma published by Academic Press, N.Y., N.Y. in 1982.

"Glass transition temperature (Tg)" is a narrow range of temperature, as measured by conventional differential scanning calorimetry (DSC), during which amorphous polymers change from relatively hard brittle glasses to relatively soft viscous rubbers. To measure the Tg by this method, the copolymer samples were dried, preheated to 120° C., rapidly cooled to −100° C, and then heated to 150° C. at a rate of 20° C./minute while data was being collected. The Tg was measured at the midpoint of the inflection using the half-height method. Alternatively, the reciprocal of the glass transition temperature of a particular copolymer composition may typically be estimated with a high degree of accuracy by calculating the sum of the respective quotients obtained by dividing each of the weight fractions of the respective monomers, $M_1, M_2, \ldots M_n$, from which the copolymer is derived by the $T_g$ value for the homopolymer derived from the respective monomer, according to an equation of the form:

$$1/T_{g(copolymer)} = \sum_{i=1}^{n} w_{(Mi)}/T_{g(Mi)} \tag{1}$$

wherein:

$T_{g(copolymer)}$ is the estimated glass transition temperature of the copolymer, expressed in ° Kelvin (° K);

$w_{(Mi)}$ is the weight fraction of repeat units in the copolymer derived from an $i^{th}$ monomer $M_i$; and $T_{g(Mi)}$ is the glass transition temperature, expressed in ° Kelvin (° K), of the homopolymer of an $i^{th}$ monomer $M_i$.

The glass transition temperature of various homopolymers may be found, for example, in "Polymer Handbook", edited by J. Brandrup and E. H. Immergut, Interscience Publishers.

"Dispersed polymer" means particles of polymer colloidally dispersed and stabilized in an aqueous medium.

"Solubilized polymer" includes "Water soluble polymer", "Water reducible polymer" or a mixture thereof. Water soluble polymer means a polymer dissolved in an aqueous medium. Water reducible polymer means a polymer dissolved in water and water miscible solvent. Solubilized polymer results in a polymer solution characterized by having the self-crowding constant (K) of the Mooney equation [$1/\ln_{\eta rel}=1/BC-K/2.5$] equal to zero. By contrast, dispersed polymer has (K) equal to 1.9. The details of Mooney equation are disclosed in an article entitled "*Physical Characterization of Water Dispersed and Soluble Acrylic Polymers*" by Brendley et al., in "Nonpolluting Coatings and Coating Processes" published by Plenum Press, 1973 and edited by Gordon and Prane.

"Polymer particle size" means the diameter of the polymer particles measured by using a Brookhaven Model BI-90 Particle Sizer supplied by Brookhaven Instruments Corporation, Holtsville, N.Y., which employs a quasi-elastic light scattering technique to measure the size of the polymer particles. The intensity of the scattering is a function of particle size. The diameter based on an intensity weighted average is used. This technique is described in Chapter 3, pages 48–61, entitled *Uses and Abuses of Photon Correlation Spectroscopy in Particle Sizing* by Weiner et al. in 1987 edition of American Chemical Society Symposium series.

"Polymer solids" means polymer in its dry state.

The term "(meth)acrylate" includes acrylate and methacrylate.

The method of the present invention directed to producing a waterborne isocyanate-modified polymer includes reacting an isocyanate-reactive polymer in an aqueous medium with a compound terminated with at least two isocyanate-functional groups to produce the waterborne isocyanate-modified polymer.

The isocyanate-reactive polymer has a $T_g$ in the range of from −56° C. to 100° C., preferably, in the range of from −40° C. to 100° C. and, more preferably, in the range of from −10° C. to 70° C.

The isocyanate-reactive polymer is preferably prepared in the aqueous medium by conventional polymerization methods, such as, for example, emulsion polymerization from a monomer mixture, which includes at least one isocyanate-reactive monomer, which is capable of reacting with an isocyanate. It is contemplated that one may incorporate the isocyanate-reactive functionality into the polymer by either adding the isocyanate-reactive monomer to the reaction mixture or by a post-functionalization reaction which would incorporate the isocyanate-reactive functionality into polymer after the polymerization is completed.

The amount of the isocyanate-reactive monomer added to the monomer mixture is adjusted to provide the isocyanate-reactive polymer with at least one isocyanate-reactive moiety per polymer chain. The range of isocyanate-reactive moieties present on the isocyanate-reactive polymer chain varies from 1 to 30, preferably from 2 to 10, more preferably from 2 to 4. If the number of isocyanate-reactive moieties present on a polymer chain exceeds 30, the film formation of the resulting-waterborne isocyanate-modified polymer will be adversely affected. If the number of isocyanate-reactive moieties present on a polymer chain is less than 1, a coating resulting from such a waterborne isocyanate-modified polymer will not have desired properties, such as, toughness; gloss; adhesion; and abrasion, solvent and UV resistance.

Preferably, the isocyanate-reactive polymer is emulsion polymerized in the aqueous medium by copolymerizing at least one monomer containing an isocyanate-reactive functionality, which includes aceto acetoxyethyl (meth)acrylate; N-cyanoacetyl-N-methylaminoethyl (meth)acrylate; hydroxy alkyl (meth)acrylate monomers, such as, hydroxyethyl (meth)acrylate, and hydroxypropyl (meth)acrylate; acrylamide; methacrylamide; alkyl substituted acrylamide and isomers of hydroxy butyl (meth)acrylate. Hydroxy alkyl (meth)acrylate monomers are preferred. Hydroxyethyl (meth)acrylate is more preferred.

The remainder of the monomers in the monomer mixture suitable for preparing the isocyanate-reactive polymer include alkyl (meth)acrylate monomers, such as, ($C_1$–$C_{20}$) alkyl (meth)acrylate monomers. As used herein, the terminology "($C_1$–$C_{20}$)alkyl" denotes an alkyl substituent group having from 1 to 20 carbon atoms per group. Suitable ($C_1$–$C_{20}$)alkyl (meth)acrylate monomers include, for example, acrylic and methacrylic ester monomers including methyl (meth)acrylate, ethyl (meth)acrylate, butyl (meth)acrylate, 2-ethylhexyl (meth)acrylate, decyl (meth)acrylate, lauryl (meth)acrylate, cetyl (meth)acrylate, eicosyl (meth)acrylate, isobornyl (meth)acrylate, isodecyl (meth)acrylate, oleyl (meth)acrylate, palmityl (meth)acrylate, stearyl (meth)acrylate, or various mixtures thereof. Vinyl ester monomers, such as, for example, vinyl acetate, vinyl propionate, vinyl neononanoate, vinyl neodecanoate, vinyl-2-ethylhexanoate, vinyl pivalate, vinyl versatate or a mixture thereof. Suitable vinyl monomers include, for example, vinyl halide, preferably vinyl chloride, vinylidene halide, preferably vinylidene chloride, or various mixtures thereof. Suitable vinyl aromatic monomers include, for example, one or more polymerizable vinyl aromatic compounds and mixtures thereof and also include styrene, alkyl-substituted styrenes, such as, α-metlhylstyrene, α-ethylstyrene, p-metlhylstyrene and vinyl xylene, halogenated styrenes, such as, chlorostyrene, bromostyrene and dichlorostyrene, other styrenes having one or more nonreactive substituents on the benzene nucleus, vinyl naphthalene; acrylonitrile or various mixtures thereof.

The preferred monomer mixture includes hydroxyethyl (meth)acrylate and monoethylenically unsaturated monomers, such as, methyl methacrylate, butyl acrylate, butyl methacrylate, ethyl acrylate, ethylhexyl acrylate, styrene, methyl styrene or various mixtures thereof.

A more preferred monomer mixture includes at least one or more of the following:

1) butyl acrylate, hydroxyethyl (meth)acrylate and methyl methacrylate, 2) butyl methacrylate, hydroxyethyl (meth)acrylate and methyl methacrylate, 3) butyl acrylate, hydroxyethyl (meth)acrylate and styrene, 4) 2-ethylhexyl acrylate, hydroxyethyl (meth)acrylate and methyl methacrylate, or 5) 2-ethylhexyl acrylate, hydroxyethyl (meth)acrylate and styrene.

The most preferred monomer includes styrene, hydroxyethyl (meth)acrylate and 2-ethylhexyl acrylate.

If desired, the isocyanate-reactive polymer further includes in the range of from 0.5 percent to 20.0 percent, preferably in the range of from 2 percent to 10 percent, of a monomer containing an acid functionality, all percentages being in weight percent based on the total weight of polymer solids.

The acid functionality results from including in the monomer mixture one or more of the monoethylenically unsaturated carboxylic acid monomers, such as, for example, acrylic acid, methacrylic acid, itaconic acid, crotonoic acid, aconitic acid, atropic acid, maleic acid, maleic anhydride, fumaric acid, vinyl benzoic acid, half-esters of ethylenically unsaturated dicarboxylic acids, half-amides of ethylenically unsaturated dicarboxylic acids and various mixtures thereof. Other suitable monomer include one or more monomethyl itaconale, monomethyl fumarate, monobutyl fumarate, acrylamido propane sulfonate, sodium vinyl sulfonate, 2 acrylamido-2-methylpropanesulfonic acid, 2-methacryloxyethyl phosphate and phosphoethyl(meth)acrylate. The monomer containing the monoethylenically unsaturated carboxylic acid are preferred and acrylic acid, methacrylic acid and mixtures thereof are more preferred.

The polymerization process is typically initiated by conventional free radical initiators, such as, for example, hydrogen peroxide, t-butyl hydroperoxide, ammonium and alkali persulfates, typically at a level of 0.05 percent to 3.0 percent by weight, all weight percentages based on the weight of total monomer. Redox systems using the same initiators coupled with a suitable reductant such as, for example, sodium bisulfite, sodium hydrosulfite and isoscorbic acid, may be used at similar levels.

Chain transfer agents may be used in an amount effective to provide the desired CPC weight average molecular weight. For the purposes of regulating molecular weight of the polymer being formed, suitable chain transfer agents include well known halo-organic compounds, such as, carbon tetrabromide and dibromodichloromethane; sulfur-containing compounds, such as, alkylthiols including ethanethiol, butanethiol, tert-butyl and ethyl mercaptoacetate, as well as aromatic thiols; or various other organic compounds having hydrogen atoms which are readily abstracted by free radicals during polymerization. Additional suitable chain transfer agents or ingredients include but are not limited to butyl mercaptopropionate; isooctylmercapto propionate; bromoform; bromotrichloromethane; carbon tetrachloride; alkyl mercaptans, such as, 1-dodecanthiol, tertiary-dodecyl mercaptan, octyl mercaptan, tetradecyl mercaptan, and hexadecyl mercaptan; alkyl thioglycolates, such as, butyl thioglycolate, isooctyl thioglycoate, and dodecyl thioglycolate; thioesters; or combinations thereof. Mercaptans are preferred.

When a dispersion of polymer particles is utilized, the polymer particle size is controlled by the amount of conventional surfactants added during the emulsion polymerization process. Conventional surfactants include anionic, nonionic emulsifiers or their combination. Typical anionic emulsifiers include the salts of fatty rosin and naphthenic acids, condensation products of naphthalene sulfonic acid and formaldehyde of low molecular weight, carboxylic polymers and copolymers of the appropriate hydrophile-lipophile balance, alkali or ammonium alkyl sulfates, alkyl sulfonic acids, alkyl phosphonic acids, fatty acids, and oxyethylated alkyl phenol sulfates and phosphates. Typical nonionic emulsifiers include alkylphenol ethoxylates, polyvinyl alcohols, polyoxyethylenated alkyl alcohols, amine polyglycol condensates, modified polyethoxy adducts, long chain carboxylic acid esters, modified terminated alkylaryl ether, and alkylpolyether alcohols. Typical ranges for surfactants are between 0.1 to 6 percent by weight based on total weight of total monomer.

If desired the isocyanate-reactive polymer may include multi-stage polymer particles having two or more phases of various geometric structures, such as, for example, core/shell or core/sheath particles, core/shell particles with shell phases incompletely encapsulating the core, core/shell particles with a multiplicity of cores and interpenetrating network particles. In all of these cases, the majority of the surface area of the particle will be occupied by at least one outer phase and the interior of the latex polymer particle will be occupied by at least one inner phase. The outer phase of the multi-stage polymer particles weighs 5 weight percent to 95 weight percent based on the total weight of the particle. It is often desirable for each stage of the multi-stage polymer particles to have a different Tg. If desired, each stage of these multi-stage polymer particles may be provided with different GPC number average molecular weight, such as, the multi-stage polymer particle composition disclosed in U.S. Pat. No. 4,916,171.

The multi-stage polymer particles of the isocyanate-reactive polymer are prepared by conventional emulsion polymerization process in which at least two stages differing in composition are formed in a sequential fashion. Such a process usually results in the formation of at least two polymer compositions. Each of the stages of the multi-stage polymer particles may contain the same chain transfer agents, surfactants, as those disclosed earlier. The emulsion polymerization techniques used for preparing Such multi-stage polymer particles are well known in the art and are disclosed, for example, in the U.S. Pat. No. 4,325,856, 4,654,397, 4,814,373 and 4,916,171.

Once the polymerization is substantially completed, the compound terminated with at least two isocyanate-functional groups is added to the aqueous medium containing the isocyanate-reactive polymer. The rate at which the compound is added, varies 0.2 percent to 100 percent of the total isocyanate charge per minute, more preferably in the range of from 1 percent to 10 percent of the total isocyanate charge per minute, to permit a controlled and homogeneous dispersion of the compound into the mixture. The aqueous medium containing the isocyanate-reactive polymer is preferably constantly agitated during the addition to improve mixing. More preferably the aqueous medium is stirred to create a vortex and the compound is preferably added at the center of a funnel shape of the vortex to improve the distributive mixing. It is believed without reliance thereon, that the isocyanate terminated compound reacts with the isocyanate-reactive polymer to produce the water-borne isocyanate-modified latex polymer of the present invention having extended shelf stability. When hydroxy-functional polymers are used, urethane linkages are believed to be formed by the reaction of the hydroxy groups with the isocyanate groups. The isocyanate terminated compound is added to the aqueous medium at a stoichiometric ratio (SR) stated below:

$$\frac{\text{The isocyanate-functional groups on the isocyanate-terminated compound}}{\text{The isocyanate-reactive moities on the isocyanate-reactive polymer}}$$

The preferred SR varies in the range of from 0.5 to 5 and more preferred SR varies in the range of from 0.5 to 1.5. If the SR exceeds the upper limit, excessive amounts of urea groups are formed by the isocyanate-water reaction. As a result, the desired properties, such as, water sensitivity, shelf stability, impact resistance, solvent resistance of coating resulting from such an isocyanate-modified polymers are adversely affected. If the SR is below the lower limit, no significant enhancement in the desired properties, such as, water sensitivity, shelf stability, impact resistance, solvent resistance of coating resulting from such an isocyanate-modified polymers is achieved.

The isocyanate compound is preferably provided with a molecular weight in the range of from 200 to 1000, preferably in the range of from 200 to 700, more preferably in the range from 200 to 500.

Some of the desired compounds terminated with at least two isocyanate functionalities include aliphatic, cycloaliphatic or aromatic polyfunctional isocyanates, preferably difunctional aliphatic or cycloaliphatic diisocyanates. Examples of such diisocyanates are hexamethylene diisocyanate, trimethylhexamethylene diisocyanate, bis(4-isocyanatocyclohexyl)-methane, such as, Desmodur® W from Bayer, Pittsburgh, Pa., xylylene diisocyanate, tetramethyl xylene diisocyanate.

Examples of aromatic and polyfunctional isocyanates are: toluene diisocyanate, diphenylmethane diisocyanate, Bayer's Desmodur® N (trifunctional biuret of hexamethylene diisocyanate), Desmodur® N3390 (isocyanurate trimer of hexamethylene diisocyanate), allophanates, biurets, and uretdiones of diisocyanates or various mixtures thereof.

Some other compounds suitable for use in the present invention include, tetramethylene diisocyanate, 1,4-cyclohexane diisocyanale, 2,4- and 2,6-hexalhydrotolylene diisocyanate, 1,4- and 1,3-phenylene diisocyanate, 4,4'-diphenylmethane diisocyanate, 1,5-napthylene diisocyanate, hexamethylene diisocyanate, isophorone diisocyanate, water dispersible polyisocyanates, such as, those described in U.S. Pat. No. 5,185,200, U.S. Pat. No. 5,200,489, EP 516,277, EP 486,881, and in Bock and Petzoldt, *Modern Paint and Coatings,* February 1996, p.22, and the references noted therein; also included are various mixtures of the above isocyanates.

The water dispersible polyisocyanates suitable for use in the present invention described at column 2, lines 33–51 in U.S. Pat. No. 5,200,489 include a polyisocyanate composition which is dispersible in water, has an average NCO functionality of 2 to 6 and contains:

a) a polyisocyanate adduct prepared from 1,6-hexamethylene diisocyanate or a mixture of hexamethylene diisocyanate with up to 70% by weight, based on the weight of the diisocyanates, of another diisocyanate, and b) at least 10% by weight, based on the weight of the polyisocyanate adduct, of an emulsifier which is based on the reaction product of:

i) a monohydroxy functional polyether wherein the ethylene oxide portion of the polyether has a molecular weight of 200 to 1000 and the polyether has a total molecular weight of 200 to 1500 with ii) either a polyisocyanate adduct which corresponds to component a), or another polyisocyanate.

Yet another water dispersible polyisocyanate suitable for use in the present invention described on the first page of EP patent Application 486,881 includes a non-aqueous polyisocyanate preparation that can be emulsified in water. Such a preparation contains:

a) at least one aliphatic polyisocyanate with an average NCO functionality of 2.5 to 3.5, and b) the reaction product of an isocyanate selected from the group consisting of tetramethylene diisocyanate, hexamethylene diisocyanate, dodecamethylene diisocyanate, 1,4-diisocyanatocyclohexane, 4,4'-di(isocyanatocyclohexyl)-methane, trimethylhexane diisocyanate, tetramethylhexane diisocyanate, 1-isocyanato-3,3,5-trimethyl-5-(isocyanatomethyl) cyclohexane, 2,4-and 2,6-toluylene diisocyanate, tetramethylxylylene diisocyanate, p-xylene diisocyanate, 2,4'-and 4,4'-diisocyanatodiphenylmethane and a mixture of at least two of said diisocyanates with a monohydric or polyhydric polyalkylene ether alcohol with 2 to 4 carbon atoms in the alkylene groups and which has a polyether chain containing at least 8 ethylene oxide units, said reaction product being used in an amount sufficient to confer dispensability to said polyisocyanate.

If desired an acid-reactive crosslinking agent may be added during or after the addition of the isocyanate compound to the aqueous medium containing the isocyanate-reactive polymer provided with the acid-functionality, to crosslink the waterborne isocyanate modified acrylic polymer of the present invention. In this manner, the waterborne isocyanate-modified acrylic polymer may be used in a two-pack thermosetting formulation, that is typically stored in separate containers and then mixed by the user prior to it application. It is believed with out reliance thereon that the acid-reactive crosslinking agent crosslinks with the acid functionality of the isocyanate-reactive polymer.

If desired the aqueous medium may include additives, such as surfactants, pigments and extenders, biocides, pH stabilizers, antifoam agents, plasticizers, wetting agents and other surface control agents, wet edge additives, and drying agents. In general, there may be less than 70 percent, preferably less than 50 percent by weight, based on the total weight of the composition, of the pigment. Suitably, the remaining foregoing additives, when present, would not exceed 10 percent by weight, based on the total weight of the composition, for each additive, and usually only up to 1 percent or 2 percent of each other additive would be present.

If desired the aqueous medium may also contain cosolvents. Examples of such cosolvents include alcohols, such as, methanol, ethanol, isopropanol, ethylene glycol, butanol and 2-ethylhexanol, glycolethers such as ethylene glycolmonoethylether, diethyleneglycol monobutylether and propylene glycol methyether; ketones, such as, acetone and methylethylketone; solvents, such as, N-methylpyrolidone, dimethylformamide and tetrahydrofuran; partially miscible solvents, such as, toluene, xylene, heptane, mineral spirits, and glycolether acetates, such as, methylether of propylene glycolacetate. These may be added as coalescing solvents at levels sufficient to lower the film formation temperature of the resulting formulation to a temperature below that required for the particular coating application envisaged.

The one-pack waterborne isocyanate-modified polymer of the present invention provides improved shelf storage stability over conventional two-pack (two component) acrylic urethane coatings, which typically have a pot life varying from 10 to 35 minutes to few hours, typically 1 to 4 hours. The polymer of the present invention has extended shelf life in excess of at least one month, typically several years. The coatings resulting from the waterborne isocyanate-modified acrylic polymer of the present invention exhibit toughness; impact, solvent, abrasion, mar, and block resistance; resistance to degradation from ambient and artificial UV light, which results from interior fluorescent lighting. As a result, the coatings resulting from the waterborne isocyanate-terminated polymer of the present invention are suitable for use in the industrial coatings applications, such as, in aerosol applications, floor coatings, foamed coatings, dip coatings, automotive coatings; interior and exterior architectural coatings; wood coatings; coatings on leather; coatings on polymer substrates, such as, acrylonitrile butadiene styrene; scratch resistant protective coatings, such as those on plastic lenses.

The coatings resulting from the waterborne isocyanate-terminated acrylic polymer of the present invention are also suitable for use in adhesives; construction products, such as, caulks, mastics; specialty industrial chemicals, such as, a flocking binder used in automotive interior applications, including glove boxes.

The following test procedures were used for evaluating the polymer compositions used in the method of the present invention:

The emulsion stability of the waterborne isocyanate-modified compositions was measured by periodically stirring the waterborne isocyanate-modified composition in an aqueous medium contained in a vessel with a stirring device, such as, a stick or a stirrer, and then visually examining the stirring device for the presence of any grit, gel, or other coagulated material, particularly after carefully scraping of the bottom and sides of the vessel containing the aqueous medium. "Gelled" compositions (i.e. those without stability) typically formed a solid mass into which the stirring device cannot be substantially inserted. Compositions with acceptable stability could be stirred easily after a period of one week, even though such compositions may contain a small amount of coagulum or gel, typically under about 2 percent of the total weight, which could be removed by filtration with a coarse filter such as a 60 mesh filter. Compositions, which are substantially free from coagulum or gel are considered to have higher than acceptable level of stability.

Some of the embodiments of the invention will now be described in detail in the following Examples.

Procedure for Preparation of Polymer 1

To a 5 liter stirred reactor containing 1383.0 g. of deionized water (DI water) and 48.2 g. of an aqueous solution of sodium dodecyl benzene sulfonate (23% active ingredient) which had been heated to 85 ° C., 43.4 g. of Monomer Mixture 1 (MM # 1) listed in Table below was added. The container used for storing MM # 1 was then rinsed with 15 g. of DI water and the rinse was added to the reactor. A solution of 2.08 g. of ammonium persulfate in 15.0 g. DI water and a solution of 2.08 g. sodium carbonate in 45 g. DI water was then added. Ten minutes after the first addition of MM # 1, with the temperature of the reaction mixture maintained at 85° C., the remainder of MM # 1 and a solution of 2.08 g. of ammonium persulfate in 150.0 g. DI water were uniformly added to the reaction mixture over a 180 minute period. The final reaction mixture was neutralized to a pH of 7.5 with 29% aqueous ammonia. The same procedure described herein was used for preparing Polymers 2, 3 and Comparative Polymer A, by utilizing appropriate Monomer Mixtures listed in Tables below:

| DI water | 425.60 |
|---|---|
| Monomer Mixture 1 for Polymer 1 | |
| sodium dodecyl benzene sulfonate | 12.56 |
| Butyl Acrylate | 708.08 |
| Methyl Methacrylate | 511.32 |
| Acetoacetoxy ethyl Methacrylate | 138.60 |
| Methacrylic acid | 27.71 |
| 1-Dodecanethiol @ 98% | 13.85 |
| Monomer Mixture for Polymer 2 | |
| sodium dodecyl benzene sulfonate | 12.56 |
| Butyl Acrylate | 708.08 |
| Methyl Methacrylate | 511.32 |
| Hydroxyethyl Methacrylate | 138.60 |
| Methacrylic acid | 27.71 |
| 1-Dodecanethiol @ 98% | 13.85 |
| Monomer Mixture for Polymer 3 | |
| sodium dodecyl benzene sulfonate(23% active) | 87.36 |
| Butyl Acrylate | 708.08 |
| Methyl Methacrylate | 511.32 |
| Hydroxyethyl Methacrylate | 138.60 |
| Methacrylic acid | 27.71 |
| Monomer Mixture for Comparative Polymer A | |
| sodium dodecyl benzene sulfonate (23% active) | 87.36 |
| Butyl Acrylate | 806.48 |
| Methyl Methacrylate | 551.51 |
| Methacrylic acid | 27.71 |

Procedure for Preparation of Polymer 4

To a 5 liter stirred reactor containing 1383.0 g. deionized water (DI water) and 3.0 g. of an aqueous solution of sodium dodecyl benzene sulfonate (23% active ingredient) which had been heated to 85 ° C., 43.4 g. of Monomer Emulsion #1 (ME#1) listed in Tables below was added. The container used for storing ME#1 was then rinsed with 15 g. of DI water and the rinse was added to the reactor. A solution of 2.08 g. of ammonium persulfate in 15.0 g. DI water and a solution of 2.08 g. sodium carbonate in 45 g. DI was then added. Ten minutes after the first addition of ME#1, with the temperature of the 10 reaction mixture maintained at 85° C., the remainder of ME#1 and a solution of 1.04 g. ammonium persulfate in 75.0 g. DI water were added to the reaction mixture at a uniform rate over a 90 minute period. Thirty minutes later, with the temperature of the reaction mixture still maintained at 85° C., Monomer Emulsion #2 (ME#2) and a solution of 1.04 g. ammonium persulfate in 75.0 g. DI water were added to the reaction mixture at a uniform rate over a 90 minute period. The final reaction mixture was neutralized to a pH of 7.5 with 29% aqueous ammonia. The same procedure described herein was used for preparing Polymer 5, by utilizing appropriate Monomer Emulsions listed in Tables below:

| DI water | 212.80 |
|---|---|
| Monomer Emulsion No. 1 for Polymer 4 | |
| sodium dodecyl benzene sulfonate (23% active) | 6.28 |
| Methyl Methacrylate | 557.02 |
| Butyl Acrylate | 73.43 |
| Styrene | 55.42 |
| Methacrylic Acid | 6.93 |
| Monomer Emulsion No. 2 for Polymer 4 | |
| sodium dodecyl benzene sulfonate(23% active) | 6.28 |
| Butyl Acrylate | 372.70 |
| Methyl Methacrylate | 146.90 |
| Hydroxyethyl Methacrylate | 138.60 |
| Methacrylic acid | 34.64 |
| 1-Dodecanethiol @ 98% | 6.92 |
| DI water | 212.84 |
| Monomer Emulsion No. 1 for Polymer 5 | |
| sodium dodecyl benzene sulfonate (23% active) | 43.68 |
| Methyl Methacrylate | 557.02 |
| Butyl Acrylate | 73.43 |
| Styrene | 55.42 |
| Methacrylic acid | 6.93 |
| Monomer Emulsion No. 2 for Polymer 5 | |
| sodium dodecyl benzene sulfonate (23% active) | 43.68 |
| Butyl Acrylate | 372.70 |
| Methyl Methacrylate | 146.90 |
| Hydroxyethyl Methacrylate | 138.60 |
| Methacrylic acid | 34.60 |

Preparation of Isocyanate Modified Latex Polymers

Examples 1 through 8 of the isocyanate-modified polymers of the present invention, shown in Table 1 below, were prepared under the following procedure.

A 4-necked round bottom flask, equipped with a condenser, a stirrer and thermometer was charged with a Polymer shown in Table 1 below. The isocyanate compound, listed in Table 1 below, was then added to the charge. Additional DI water, listed in Table 1 below, was added to the reaction mixture to adjust the final solids of the resulting isocyanate-modified polymer, which was stirred overnight at room temperature under nitrogen. The reaction mixture was then neutralized to a pH=7.0 with aqueous ammonium hydroxide (28%).

TABLE 1

|  | Ex. 1 | Ex. 2 | Ex. 3 | Ex. 4 | Ex. 5 | Comp Ex. 6 | Ex. 7 | Ex. 8 |
| --- | --- | --- | --- | --- | --- | --- | --- | --- |
| Polymer | | | | | | | | |
| Polymer 2 | 100 | | | | | | | |
| Polymer 3 | | 100 | | | | | | |
| Polymer 1 | | | 100 | | | | | |
| Polymer 4 | | | | 100 | | | | |
| Polymer 5 | | | | | 100 | | | |
| Polymer A | | | | | | 100 | | |
| Polymer 2 | | | | | | | 100 | |
| Polymer 4 | | | | | | | | 100 |
| Compound | | | | | | | | |
| IC No. 1 | 4 | 3 | 2 | 4 | 3 | 2 | 0 | 0 |
| IC No. 2 | 0 | 0 | 0 | 0 | 0 | 0 | 3.3 | 3.9 |
| DI water | 10 | 15 | 15 | 10 | 15 | 15 | 2.6 | 0 |
| Properties | | | | | | | | |
| Final Weight % Solids | 37.8 | 35.2 | 34.7 | 37.5 | 34.6 | 34.4 | 40.0 | 41.1 |
| Particle size (nm) | 201 | 66 | 213 | 201 | 76 | 81 | 201 | 201 |
| Stability | X | X | Y | X | X | Z | X | X |

The following abbreviations were used in Table 1 above:
Ex. means Example.
Compound means isocyanate compound.
IC No. 1 means Desmodur® XP-7063 water dispersible polyisocyanate supplied from Bayer, Pittsburgh, Pa.
IC No. 2 means Desmodur® W bis (4-isocyanatocyclohexyl)-methane supplied from Bayer, Pittsburgh, Pa.
X means no gel or coagulum observed after a period of one week, which is an indication of higher than acceptable level of stability. The observation was discontinued thereafter.
Y means slight filterable gel or coagulum observed after a period of one week, which is an indication of acceptable level of stability. The observation was discontinued thereafter.
Z means gelled, which is an indication of a composition that is not stable.

From Table 1 it can be seen that the waterborne isocyanate-modified acrylic polymers of the present invention, made from emulsion polymers containing isocyanate-reactive functional groups (Examples 1–5, 7 and 8) are more stable than the one without Such functionalities (Comparative Example 6).

What is claimed is:

1. A method of producing a one-pack shelf stable waterborne isocyanate-modified acrylic polymer consisting essentially of:
   reacting a compound terminated with at least two isocyanate-functional groups with an isocyanate-reactive acrylic polymer in an aqueous medium to produce said one-pack shelf stable waterborne isocyanate-modified acrylic polymer,
   wherein said isocyanate-reactive acrylic polymer consists essentially of a copolymer polymerized from a monomer mixture which consists essentially of:
   (a) at least one monoethylenically unsaturated monomer selected from the group consisting of (meth) acrylic acid monomers, alkyl (meth)acrylate monomers, vinyl monomers and mixtures thereof;
   (b) at least one isocyanate-reactive monomer selected from the group consisting of acetyl acetoxyethyl (meth)acrylate, N-cyanoacetyl-N-methylaminoethyl (meth)acrylate, hydroxyethyl (meth)acrylate, hydroxypropyl (meth)acrylate, isomers of hydroxy butyl (meth)acrylate and mixtures thereof.

2. The method of claim 1 wherein said compound has a molecular weight in the range of from 200 to 1000.

3. The method of claim 1 wherein a stoichiometric ratio of said isocyanate-functional groups on said compound to isocyanate-reactive moieties on said polymer varies in the range of from 0.5:1 to 5:1.

4. The method of claim 1 wherein said isocyanate-reactive polymer is provided with from 1 to 30 isocyanate-reactive functionalities per polymer chain.

5. The method of claim 1 wherein said compound is selected from the group consisting of hexamethylene diisocyanate, bis (4-isocyanatocyclohexyl)-methane, toluene diisocyanate, trifunctional biuret of hexamethylene diisocyanate, isocyanurate trimer of hexamethylene diisocyanate, 4,4'-diphenylmethane diisocyanate, isophorone diisocyanate, water dispersible polyisocyanates and mixtures thereof.

6. The method of claim 1 wherein a stoichiometric ratio of said isocyanate-functional groups on said compound to isocyanate-reactive moieties on said polymer varies in the range of from 0.1:1 to 5:1.

7. A method of producing a one-pack shelf stable waterborne isocyanate-modified acrylic polymer consisting essentially of:
   emulsion polymerizing a monomer mixture in an aqueous medium to produce an isocyanate-reactive acrylic polymer,
   wherein said isocyanate-reactive acrylic polymer consists essentially of a copolymer polymerized from said monomer mixture which consists essentially of:
   (a) at least one monoethylenically unsaturated monomer selected from the group consisting of alkyl (meth)acrylate monomers, vinyl monomers and mixtures thereof;
   (b) at least one isocyanate-reactive monomer selected from the group consisting of acetyl acetoxyethyl (meth)acrylate, N-cyanoacetyl-N-methylaminoethyl (meth)acrylate, hydroxyethyl (meth)acrylate, hydroxypropyl (meth)acrylate, isomers of hydroxy butyl (meth)acrylate and mixtures thereof; and (c) at least one acid functional acrylic monomer; and
   adding a compound terminated with at least two isocyanate-functional groups to said aqueous medium in a stoichiometric ratio of said isocyanate-functional groups on said compound to isocyanate-reactive moieties on said copolymer varying in the range of from 0.5:1 to 5:1, said compound having a molecular weight varying in the range of from 200 to 1000; and
   reacting said isocyanate-reactive polymer with said compound to produce said one-pack shelf stable isocyanate-modified waterborne polymer having extended shelf-stability.

8. The waterborne isocyanate-modified acrylic polymer produced in accordance with claim 1 or 7.

9. The method of claim 1 or 7 wherein said one-pack shelf stable waterborne isocyanate-modified acrylic polymer has an extended shelf life of at least one month.

10. A method of producing a one-pack shelf stable waterborne isocyanate-modified acrylic polymer consisting essentially of:

reacting a compound terminated with at least two isocyanate-functional groups with an isocyanate-reactive acrylic polymer in an aqueous medium to produce said one-pack shelf stable waterborne isocyanate-modified acrylic polymer, wherein said isocyanate-reactive acrylic polymer consists essentially of a copolymer polymerized from a monomer mixture which consists essentially of:
(a) at least one monoethylenically unsaturated monomer selected from the group consisting of alkyl (meth)acrylate monomers, vinyl monomers and mixtures thereof;
(b) at least one acid functional acrylic monomer; and
(c) at least one isocyanate-reactive monomer selected from the group consisting of acetyl acetoxyethyl (meth)acrylate, N-cyanoacetyl-N-methylaminoethyl (meth)acrylate, hydroxyethyl (meth)acrylate, hydroxypropyl (meth)acrylate, isomers of hydroxy butyl (meth)acrylate and mixtures thereof.

11. A method of producing a one-pack shelf stable waterborne isocyanate-modified acrylic polymer consisting essentially of:

reacting a compound terminated with at least two isocyanate-functional groups with an isocyanate-reactive acrylic polymer in an aqueous medium to produce said one-pack shelf stable waterborne isocyanate-modified acrylic polymer, wherein said isocyanate-reactive acrylic polymer consists essentially of a copolymer polymerized from a monomer mixture which consists essentially of:
(a) at least one monoethylenically unsaturated monomer selected from the group consisting of alkyl (meth)acrylate monomers, vinyl monomers and mixtures thereof;
(b) at least one acid functional acrylic monomer; and
(c) at least one isocyanate-reactive monomer selected from the group consisting of acetyl acetoxyethyl (meth)acrylate, N-cyanoacetyl-N-methylaminoethyl (meth)acrylate, hydroxyethyl (meth)acrylate, hydroxypropyl (meth)acrylate, isomers of hydroxy butyl (meth)acrylate and mixtures thereof; and adding a crosslinking agent to said aqueous medium to produce said waterborne isocyanate-modified acrylic polymer.

* * * * *